(No Model.)
E. MISSEL & L. MEYER.
PACKING.
No. 463,531. Patented Nov. 17, 1891.
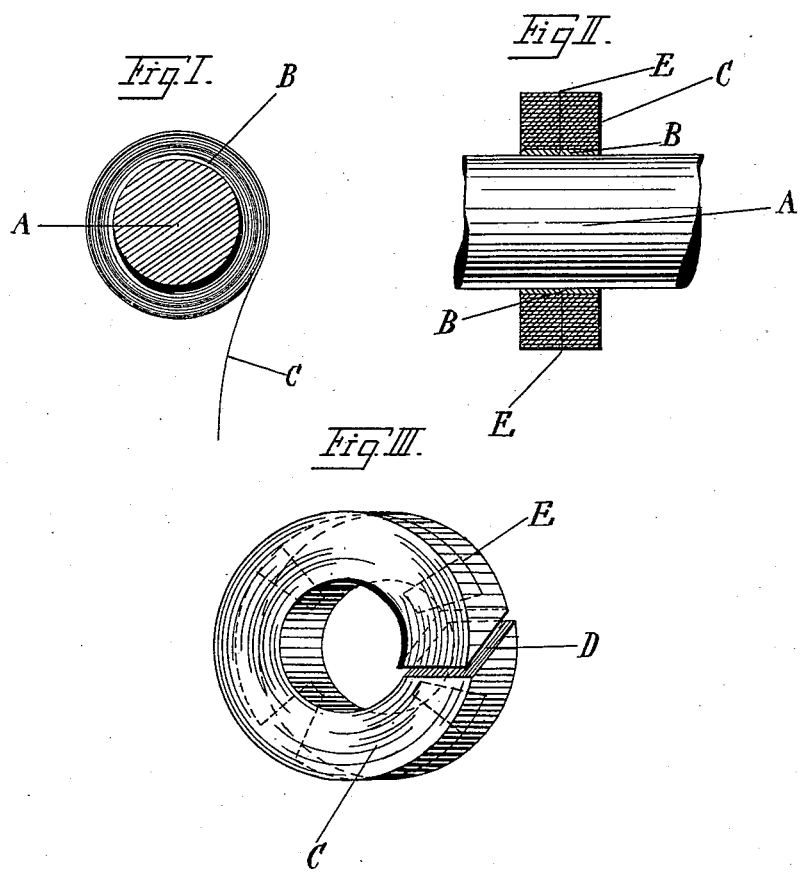
Attest
Walter Donaldson
F. L. Middleton
Inventors
Elias Missel
Leonhart Meyer
by Eli Swan
Atty

UNITED STATES PATENT OFFICE.

ELIAS MISSEL, OF STUTTGART, AND LEONHART MEYER, OF FEUERBACH, GERMANY.

PACKING.

SPECIFICATION forming part of Letters Patent No. 463,531, dated November 17, 1891.

Application filed April 4, 1891. Serial No. 387,596. (No model.)

*To all whom it may concern:*

Be it known that we, ELIAS MISSEL, manufacturer, residing at Stuttgart, in the Kingdom of Würtemburg and German Empire, and LEONHART MEYER, machinist, residing at Feuerbach, near Stuttgart, in the Kingdom of Würtemberg and German Empire, have invented new and useful Improvements in Packings, of which the following is a specification, reference being had therein to the accompanying drawings.

This invention relates to packing washers or rings for stuffing-boxes which can be placed in the stuffing-boxes in various different ways and in such a manner as to cause the washers or rings to lie closely round the rod and take the place of hemp or metal packing.

The object of the invention hereinafter described is to provide a stuffing-box packing which is self-lubricating, closes tightly on the rod being packed, is extremely durable, and preserves the rod from being worn by friction. The packing can be used either with high or low pressure steam or water-pressure.

The annexed drawings show the construction of a packing washer or ring according to this invention.

Figure 1 shows the mode of laying up the material of which the washer or rings are made. Fig. 2 is a sectional view of the packing washer or ring. Fig. 3 is a perspective view of the washer or ring.

A packing washer or ring according to this invention is constructed as follows: Round a mandrel A of the exact diameter or thickness of the rod to be packed a greased belt or band of hemp, silk, cotton, or asbestus fiber B is wound, and this is then overlaid with a specially-prepared continuous strip of paper C, manufactured from hemp, silk, cotton, or asbestus fiber. The diameter of the packing-ring corresponds to that of the stuffing-box in which it is to be used. The lubricant with which the ring is saturated and provided consists, preferably, of tallow, talc, mica, and graphite. The tallow serves as the lubricant, the talc, mica, and graphite serve as the smoothing medium, and in consequence of this property diminish the friction of the rod.

The packing-ring thus produced is generally cut obliquely across at D, in order to be laid easily round the rod to be packed and pressed into the stuffing-box. When the ring is cut open, the several paper layers C and strips B are held together by means of thread E, sewed through them, thus preventing the separation of the parts. The several rings of which the packing is composed are placed in the stuffing-box in such a manner as to have the cuts D opposite to one another. Then against the upper and lower ring there is introduced and tightly pressed a hemp plat for the purpose of preventing a direct pressure of the gland and seat against the packing-rings. In this manner the packing-rings lie quite tightly against the rod and are so pressed together by the tightening up of the gland (which latter is rarely required) that the edges of the paper are splayed and forced together. By this means the grease is transmitted to the rod.

What we claim, and desire to secure by Letters Patent of the United States, is—

1. A packing washer or ring for stuffing-boxes, consisting of an inner greased band of hemp, silk, cotton, or asbestus, over which is wound until the desired diameter is obtained a continuous band of absorbent paper made from hemp, silk, cotton, or asbestus fiber, prepared and saturated with a mixture of tallow, talc, mica, and graphite, as described.

2. A packing washer or ring for stuffing-boxes, formed of an inner greased strip of material wound upon a suitable mandrel, and an outer continuous band of absorbent paper prepared and saturated with a solution of tallow, talc, mica, and graphite wound thereon, the completed washer being severed obliquely and suitably stitched to prevent separation of the rings, substantially as described.

In witness whereof we have hereunto set our hands in presence of two witnesses.

ELIAS MISSEL.
LEONHART MEYER.

Witnesses:
CARL REVEER,
FRIEDR. BARTH.